United States Patent [19]

Nöthen et al.

[11] 4,127,945
[45] Dec. 5, 1978

[54] PROCESS AND A DRYER FOR DRYING POLYCHLOROPRENE SHEETS

[75] Inventors: Karl Nöthen, Dormagen; Francisco B. Creixell, Leverkusen; Bodo Ehrig, Dormagen, all of Germany

[73] Assignee: Bayer Aktiengesellschaft, Leverkusen, Germany

[21] Appl. No.: 746,189

[22] Filed: Nov. 30, 1976

Related U.S. Application Data

[63] Continuation of Ser. No. 691,532, Jun. 1, 1976, abandoned.

[30] Foreign Application Priority Data

Oct. 12, 1976 [DE] Fed. Rep. of Germany ....... 2645921

[51] Int. Cl.² .................................................. F26B 7/00
[52] U.S. Cl. .............................................. 34/18; 34/4; 34/60; 34/62; 34/155; 34/216

[58] Field of Search ................... 34/4, 18, 60, 62, 155, 34/210, 216

[56] References Cited

U.S. PATENT DOCUMENTS

| 3,254,422 | 6/1966 | Defiel | 34/155 X |
| 3,391,764 | 12/1945 | Andrews | 34/4 |
| 3,474,544 | 10/1969 | Holden, Jr. et al. | 34/216 |
| 3,987,556 | 10/1976 | Tissot et al. | 34/155 |

Primary Examiner—John J. Camby
Attorney, Agent, or Firm—Connolly and Hutz

[57] ABSTRACT

Object of the invention is a process for drying polychloroprene wherein hot air is blown onto both sides of the moist polychloroprene sheet. Optionally the moist sheet is exposed to infrared rays also. A further object of the invention is the dryer consisting of a warm air section and an air cooling section and optionally an infrared section.

10 Claims, 9 Drawing Figures

PROCESS AND A DRYER FOR DRYING POLYCHLOROPRENE SHEETS

This application is a continuation in part of our application Ser. No. 691,532 filed June 1, 1976, now abandoned.

This invention relates to a process for drying polychloroprene sheets obtained by low-temperature coagulation on a rotating drum and to a dryer therefor.

The low-temperature coagulation of polychloroprene sheets and the following working-up stages to form a solid polyschloroprene rubber, have long been known, and are described in Chem. Eng. Progr. 43 (1947), pages 391 to 398.

In this known process, coagulation takes place on a cooled drum rotating in a latex bath. The band of rubber formed on the surface of the drum is lifted off and passed through a washing bath where it is sprayed with water in order to remove impurities. The wet band then travels through squeezing rollers where most of the water present is removed and enters a dryer. The moisture content of the sheets before entering the dryer amounts to about 30% by weight. After leaving the dryer, the sheet is condensed into a strand which is then cut into pieces of the required length and stored.

In conventional processes, considerable difficulties are involved in carrying out the drying process in the dryer because, due to adverse flow conditions, it is only possible to obtain relatively low heat and mass transfer values. It is desirable that the sheet should have a residual moisture content of about $\leq 0.4\%$ by weight on leaving the dryer. In principle, this value is obtained by two different process variants:

(1) In a shelf dryer, the polychloroprene band travels by way of guide rollers over a plurality of horizontally adjusted shelves. Ievitably most of the band adheres to the lower side of the conveyor belt, rather than lying on it. If the tackiness of the sheet is inadequate, a large amount of waste is produced. In addition to this design-related disadvantage, the shelf dryers used for this purpose have inter alia the following further disadvantages:

(a) poor thermal efficiency, due inter alia to the constant cooling and heating of the conveyor belt;

(b) a large radiation surface; and (c) poor distribution of air inside the dryer attributable to the fact that the air is blown in a parallel stream on to one side of the sheet at a very low rate of flow (less than 1 m/second).

In dryers of this type, repair and maintenance costs are extremely high on account of the large number of movable parts under temperature stress.

The need to lubricate the moving parts of shelf dryers, for example the rollers of the conveyor belt, involves an increased risk of fire on account of lubricant deposition onto the belt.

The large amount of space taken up by a shelf dryer and also the small number of warm air nozzles mean that an extremely long period of time is required to reach the operational equilibrium. For these reasons, precision control of the dryer, necessary for example in the event of sudden changes in the operating conditions, is extremely difficult to obtain.

(2) In the other variant, the so-called loop dryer, the polychloroprene band is no longer conducted horizontally through the dryer, instead guide rollers are arranged in such a way that the band can be guided substantially vertically.

Loop dryers have inter alia the following further disadvantages in relation to shelf dryers:

In a loop dryer, the conveyor belt consists of rods surrounded by cotton sleeves which are fixed between lateral guide chains.

The sheet to be dried is placed on these sleeves. On completion of the drying process, the dry sheet can be removed more easily from this surface than from the uncovered metal rods. When, after about 4 to 6 weeks in use, the sleeves have become solid with product, they have to be removed and replaced manually. In view of the fact that a loop dryer normally contains about 2000 rods, the labour which this involves represents a considerable cost factor.

In addition, problems are involved in starting up loop dryers, because the sheet to be dried is in danger of tearing in view of the particular type of guide system used.

Factors common to both types of dryer are their limited drying capacity, their long drying time and, from the mechanical point of view, their complicated structure.

Thus, conventional shelf dryers have a length, width and height of approximately 50 meters, 5 meters and 9 meters, respectively, for a drying capacity of about 1 $t$ of polychloroprene per hour. The drying belt is approximately 400 meters long, and the drying time ranges from 20 to 30 minutes. Drying is generally obtained by a combined arrangement of electrical infrared heaters and a few hot-air nozzles arranged parallel to the sheet which blow hot air only on to the upper surface of the sheet, the electrical infrared heaters being arranged in most cases at the inlet end of the dryer where the polychloroprene band enters.

Conventional loop dryers have a length of 20 meters, a width of 6 meters and a height of 4 meters for a drying capacity of 1 $t$ per hour. The drying belt is approximately 200 meters long and the drying time approximately 15 minutes. Drying is obtained by means of hot air which is directed onto the sheet from nozzles at a rate of flow of approximately 0.6 to 1.0 meter per hour.

The object of the present invention is to replace the complicated dryers which have been used in the past by more simple and more effective dryers and also to develop a drying process which provides for considerably quicker and, hence, more gentle drying and, optionally, for a considerable increase in capacity.

The drying time in the dryer may be shortened by drying the polychloroprene sheet thoroughly on both sides with hot air. Optionally the moist polychloroprene sheet can be exposed to infrared heaters and, at the same time, blowing air onto the upper and lower surfaces of the sheet. When carrying out the process, it is important to ensure that the polymer sheet is not heated beyond about 350° C. It has proved to be best to heat the polymer sheet to a temperature in the range from 60° to 200° C., even more preferably from 65° to 150° C. It is of particular advantage to use infrared heaters with an emission maximum of from about 1.5 to 3μ, if used at all. In this range, the polymer only absorbs to a very limited extent and, as a result, is not chemically changed, even when exposed to high energy radiation.

In the infrared section of the dryer, the radiation intensities applied are advantageously in the range from about 5 to 30 watts per $cm^2$ and the air flow rates in the range from about 5 to 30 m per second.

In the second drying section, the energy required for evaporating the water is supplied in the form of hot air. The air is blown at a high rate onto both sides of the polymer and through nozzles.

The drying process is governed primarily by the radiation intensity, by the temperature of the hot air, by the rate of travel of the polymer band through the dryer, by the rate of flow of the hot air onto the polymer band and also by the thickness of the polymer band.

For a polymer band of given thickness, these parameters may be adapted during the drying process to the requirements subsequently imposed on the sheet of polychloroprene.

The hot-air temperature is best in the range from 100° to 400° C. and preferably in the range from 100° to 250° C., so that the polymer band is heated to a temperature of no more than about 350° C. and preferably to a temperature in the range from 60° to 200° C., particularly between 65° and 150° C.

The hot air can be produced by the usual methods, for example by the combustion of gas and oil, or by employing moisture or heat transmitters. The hot air can be produced either outside or inside the dryer.

The rate at which the polymer band is conveyed through the dryer best amounts to between 1 and 100 meters per minute and preferably to between 20 and 30 meters per minute. The optimum rate of travel of the polymer band is determined on the one hand by the working speeds of the installations preceding the dryer in the production cycle and, on the other hand, by the residence time required to obtain the final moisture content of 0.4% by weight.

The rate at which the hot air flows onto the polymer band best amounts to between 1 and 50 and preferably to between 10 and 35 m/second.

The thickness of the polymer band is normally between 0.2 and 0.7 mm, depending upon the type of chloroprene to be dried. The thickness of the band is essentially determined by the mode of operation of the coagulation drum and of the squeezing rolls by which most of the water originally present in the sheet is removed.

The drying process is carried out in a so-called single-belt jet dryer of the type described by way of example in the following with reference to the accompanying drawings, wherein.

Figure 1:
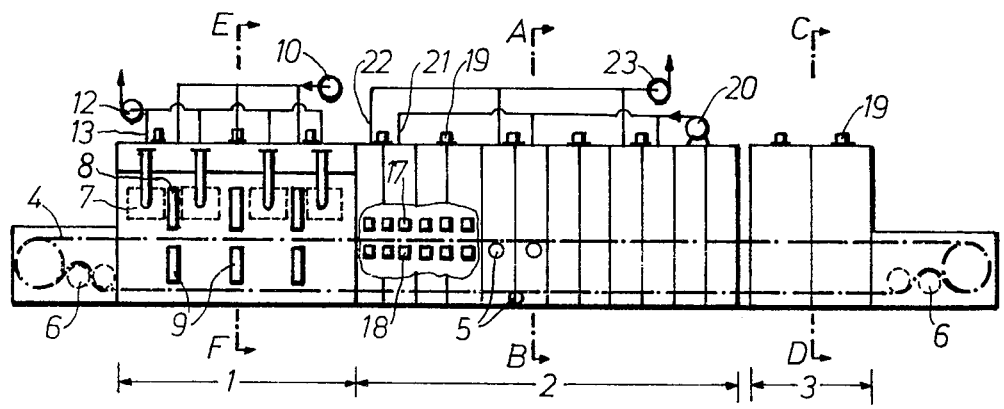
FIG. 1 is a side elevation of the dryer.
Figure 2:
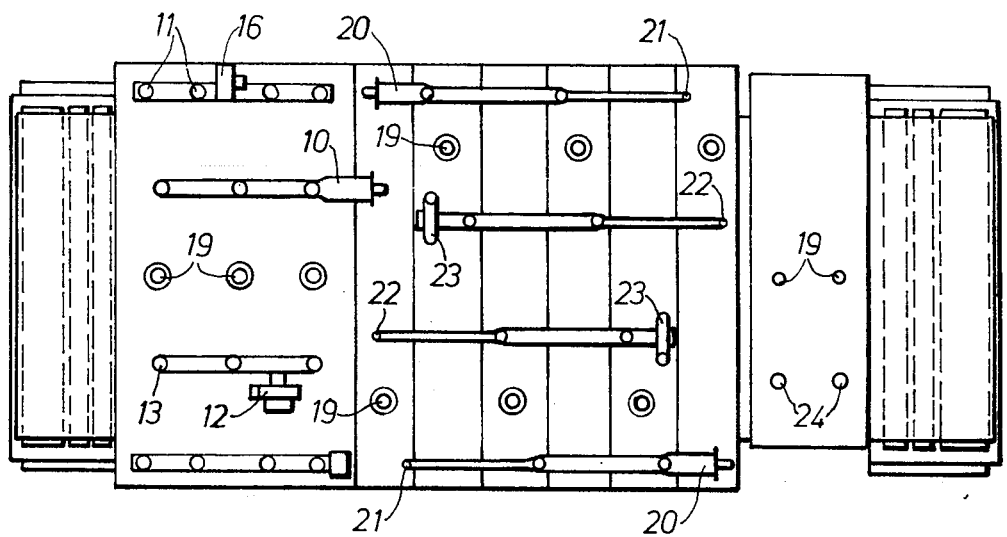
FIG. 2 is a plan view of the dryer.
Figure 3:
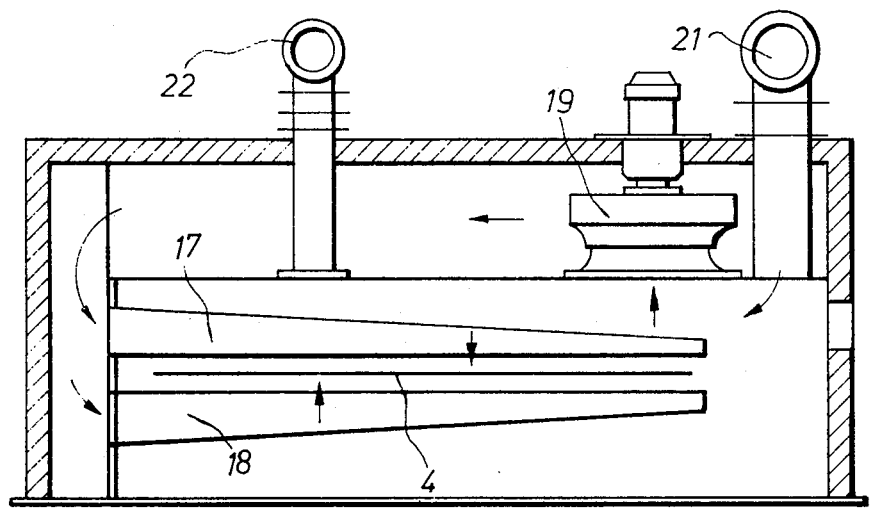
FIG. 3 is a section through the dryer on the line A–B of FIG. 1.
Figure 4:
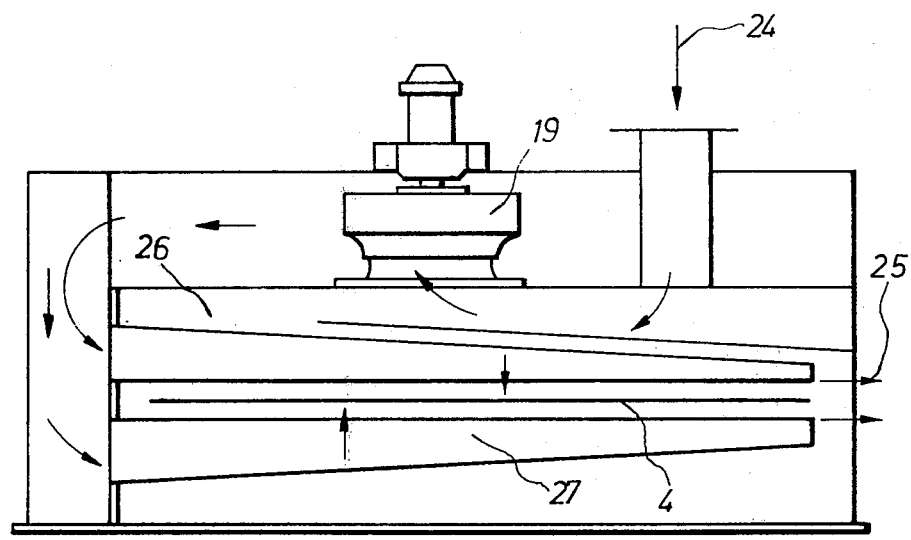
FIG. 4 is a section through the dryer on the line C–D of FIG. 1.

A continuous conveyor belt 4, for example in the form of a non-porous or porous belt, is guided through an infrared section 1, a following warm-air section 2 and an air cooling section 3, being supported by supporting rollers 5 and held in the required operational state by special tension and control means 6.

Figure 5:
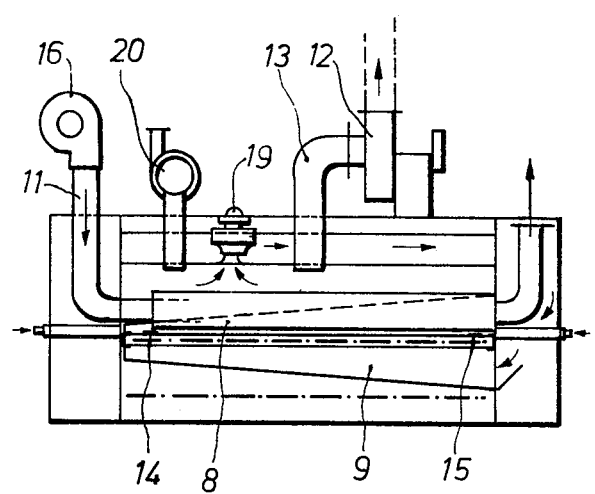
FIG. 5 is a section through the dryer on the line E–F of FIG. 1.

The infrared section 1 consists of infrared heaters 7, air nozzles 8 and 9 arranged above and below a belt, a fresh air fan for IR-heaters 16 (FIG. 5) which is connected to air inlets 11; of an exhaust fan 12, which is connected to exhaust outlets 13, of a flame monitor (FIG. 5) and of an ignition device 15 (FIG. 5). The infrared section is an optional feature.

The infrared section of the dryer is followed by the warm-air section 2 which has substantially the following structure:

Air nozzles 17, 18 are arranged both above and below the belt 4. Recirculating air fans 19 circulate the air. Hot air is produced by means of gas burners 20 and introduced into the drying chamber through the hot air inlet 21. Exhaust outlets 22 are connected to an exhaust fan 23.

The third section of the dryer is the air cooling section 3 which follows the warm air section 2. It also comprises air nozzles 26, 27 above and below the belt. In this section, too, the air is circulated by recirculating air fans 19. Cold air is introduced through cold air inlets 24, whilst used air is discharged through air outlets 25. Instead of the air cooling section described, cooling the polymer sheet by means of contact cooling, as for example with cooled metallic surfaces, is also possible.

By comparison with conventional dryers, it is possible for the first time with the dryer according to the invention considerably to reduce the length of the drying belt and greatly to reduce the drying time whilst at the same time doubling the drying capacity. A dryer of the type illustrated in the accompanying drawings has a length of 40 meters, a width of 5 meters and a height of 2 meters for a drying capacity of approximately 2.5 $t$ per hour (1.8 $t/h$ in case of a dryer without an infrared section), a drying belt length of approximately 35 meters and a drying time of approximately 1 minute.

In cases where the process and dryer according to the invention are used, efficiency, based on the heat of evaporation of the water, amounts to approximately 40% as against 20% for example in cases where conventional shelf dryers are used.

Figure 6:
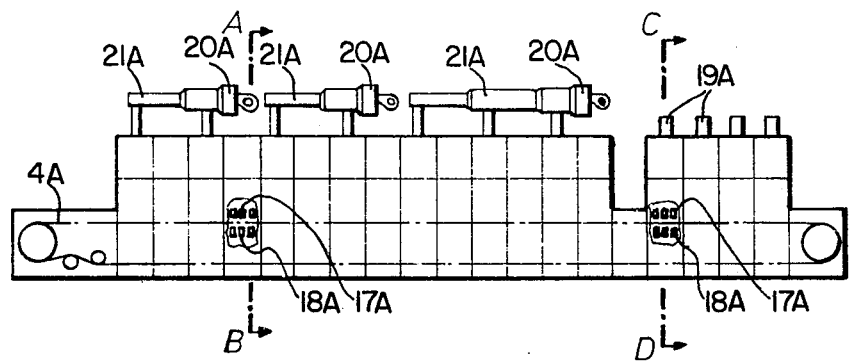

As already mentioned the dryer does not necessarily contain an infrared section. Such a dryer is described in the following Figures:

FIG. 6 is a side elevation of the dryer.

Figure 7:
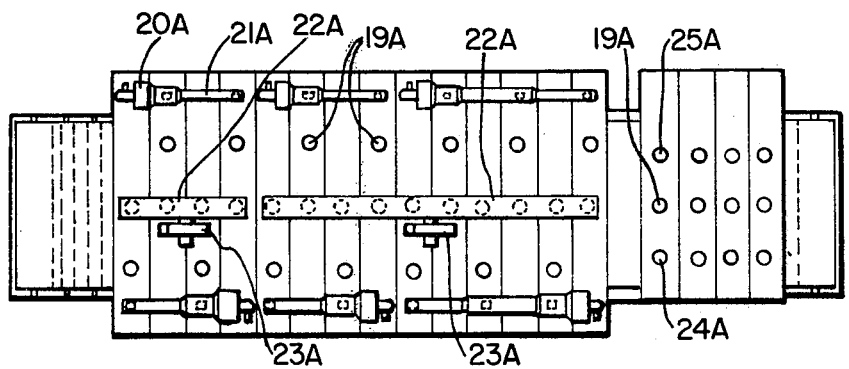

FIG. 7 is a plan view of the dryer.

Figure 8:
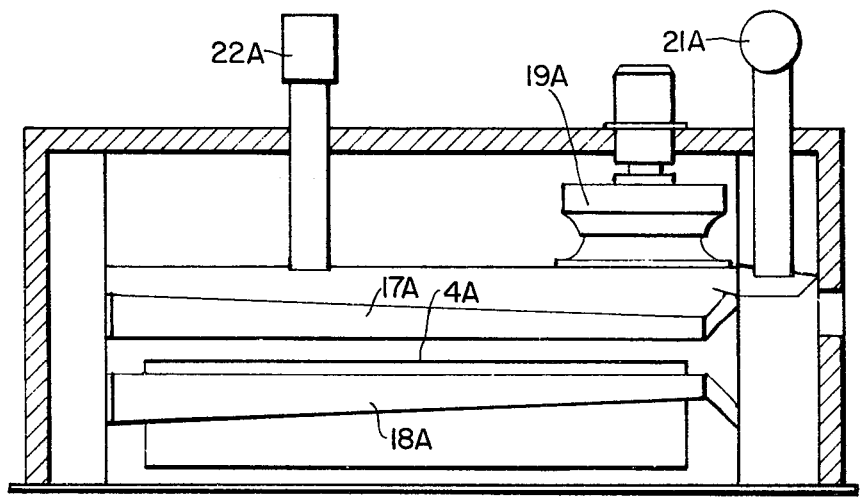

FIG. 8 is a section through the dryer on the line A–B of FIG. 6.

Figure 9:
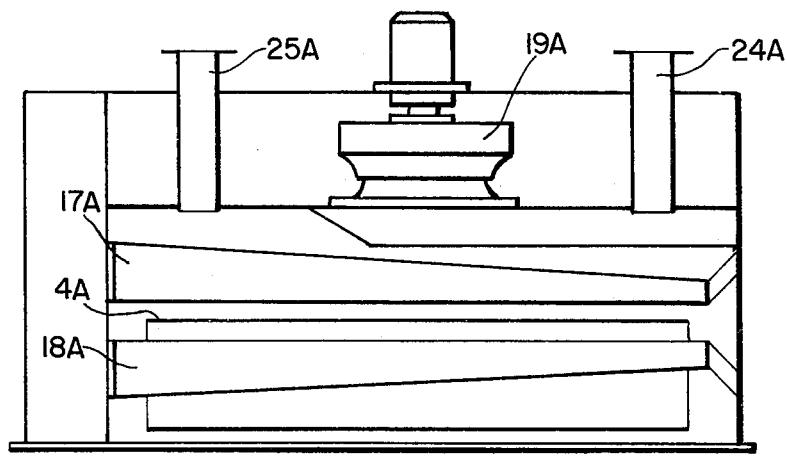

FIG. 9 is a section through the dryer on the line C–D of FIG. 6.

A continuous conveyor belt, for example in the form of a non-porous or porous belt, is guided through a warm-air section and an air-cooling section, being supported by supporting rollers and held in the required operational state by special tension and control means.

The warm-air section of the dryer has substantially the following structure:

Air nozzles 17A, 18A are arranged both above and below the belt 4A. Recirculating air fans 19A circulate the air. Hot air is produced by means of gas burners 20A and introduced into the drying chamber through the hot air inlet 21A. Exhaust outlets 22A are connected to an exhaust fan 23A.

The section of the dryer which follows the warm-air section is the air cooling section. It also comprises air nozzles 17A, 18A above and below the belt 4A. In this section, too, the air is circulated by recirculating fans 19A. Cold air is introduced through cold air inlets 24A, while used air is discharged through air outles 25A.

The invention is illustrated by the following Examples:

EXAMPLE 1

In Example 1, the polymer sheet is dried by means of a conventional dryer. 3.35 t/h of a polychloroprene latex with a polymer content of approximately 30% are coagulated on a cooled rotating drum, the polymer sheet thus formed is lifted off, washed and squeezed out. The polymer sheet is delivered to a conventional dryer with the following parameters:

EXAMPLE 2

In Example 2, the polymer sheet is dried by a dryer according to the invention. 8.35 t/h of a polychloroprene latex with a polymer content of approximately 30% are coagulated on a cooled rotating drum, the polymer sheet thus formed is lifted off, washed and squeezed out. The polymer sheet is passed through a dryer according to the invention, as shown in FIGS. 1–5, with the following parameters:

|  | Example 1 Conventional dryer (shelf dryer) | Examples 2 Dryer according to the invention (jet dryer of Fig 1–5) |
|---|---|---|
| external dimensions | length: 51000 mm<br>width: 4880<br>height: 8790 mm | 40 000 mm<br>5 000 mm<br>2 000 mm |
| Drying | | |
| drying principle | drying oven | impact stream |
| temperature | | |
| IR-zone | approx. 300° C | 300° C |
| recirculating air zones | 120° C and 80° C | 250° C and 160° C |
| drying time | approx. 18 minutes | approx. 1 minute |
| drying length | approx. 340 000 | approx. 35 000 |
| IR-heaters(number) | approx. 200 | six |
| power source (for IR) | electricity | gas |
| power density | 1.1 W/cm² to 2.2 W/cm² | 8 to 12 W/cm² |
| position of radiation max. | 1.3 to 3.5 μm | 1.3 to 3.5 μm |
| nozzles | | |
| type | perforated nozzles | perforated nozzles and protective nozzles |
| distance from sheet | 200 mm | 35 mm |
| number | 24 | 190 |
| opening | 2 mm φ | 5 mm φ |
| outflow rate | 1 m/s | 10 and 35 m/s |
| outflow direction | parallel to sheet | perpendicular to sheet |
| outflow plane | above | above and below |
| throughflow of recirculating air | approx. 15 000 m³/h | approx. 380 000 m³/h |
| exhaust output | 3000–10000 m³/h | approx. 3000–10000 m³/h |
| exhaust-air temperature | approx. 130° C | approx. 120° C |
| efficiency(%) | 20 to 24 | approx. 40 |
| heating medium | current/steam | natural gas |

In Example 1, approximately 1 t/h of a dried polychloroprene with a residual moisture content of approx. ≦ 0.4% by weight is obtained using the dryer described above.

In Example 2, approximately 2.5 t/h of a dried polychloroprene with a residual moisture content of approx. ≦ 0.4% by weight is obtained using the dryer described above.

We claim:

1. A process for drying a wet polychloroprene sheet comprising the steps of transporting the sheet in a path, applying a flow of warm air simultaneously to both surfaces of the sheet at a rate of 5 to 30 m/sec. at a temperature of 100 to 400° C., after application of the warm air applying a flow of cool air to the transported sheet to substantially cool it to ambient temperature, and the rate at which the sheet is transported ranging between 1 and 100 m. per minute.

2. A process as set forth in claim 1 wherein before the warm air is applied, exposing the transported sheet to infrared radiation at an emission maximum of 1.5 to 3μ, and the infrared radiation having a radiation intensity of 4 to 30 watts/cm².

3. A process as set forth in claim 2 wherein the total drying time of the sheet when subjected to the infrared radiation and warm air being approximately on the order of one minute.

4. A process as claimed in claim 1, wherein during the drying process the sheet is heated to a temperature of from 60° to 200° C.

5. A process as claimed in claim 1, wherein during the drying process the sheet is heated to a temperature of from 65° to 150° C.

6. A process as claimed in claim 1, wherein during the drying process the sheet is heated to a temperature of about 350° C.

7. A process as claimed in claim 1, wherein the hot air flows onto the polymer sheet at a rate of 10 to 35 m per second.

8. A dryer for drying a polychloroprene sheet, comprising a housing through which a conveyor belt is guided, the housing comprising an infrared radiation section, a warm-air section, followed by an air cooling section, the warm-air section consisting of air nozzles (17A), (18A) arranged below and above the conveyor belt 4A, the air nozzles being connected to warm-air inlets (21A) and recirculating air fans (19A), and exhaust outlets (22A), the infrared radiation section radiating at an emission maximum of 1.5 to 3μ and having a radiation intensity of 4 to 30 watts/cm², the warm air section having a flow of warm air against the sheet at a rate of 5 to 30 m/sec. at a temperature of 100° to 400° C., the conveyor belt transporting the sheet at a speed ranging between 1 to 100 m. per min., and the conveyor being constructed and arranged so that the total time that the sheet is subjected to infrared radiation and warm air is approximately on the order of one minute.

9. Dryer as claimed in claim 8, wherein the cooling section consists of air nozzles 17A, 18A arranged above and below the conveyor belt (4A), the nozzles being connected to cold-air inlets (24A) and a recirculating air fan (19A) and of air outlets (25A).

10. A dryer for comprising a tunnel housing through which a conveyor belt is guided, characterized by a warm-air section (2) which is preceded by an infrared section (1) and followed by an air cooling section (3),
  (a) the infrared section (1) consisting of infrared heaters (7) directed onto the conveyor belt (4), air nozzles (8, 9) arranged above and below the conveyor belt (4) and of air inlets (16, 11) and air outlets (12, 13),
  (b) the warm-air section (2) consisting of air nozzles (17, 18) arranged below and above the conveyor belt (4) which are connected to warm air inlets (20, 21) and recirculating air fans (19), and of exhaust outlets (22, 23), (c) the air cooling section (3) consisting of air nozzles (26, 27) arranged below and above the conveyor belt (4) which are connected to cold air inlets (24) and a recirculating air fan (19), and of air outlets (25), the infrared radiation section radiating at an emission maximum of 1.5 to $3\mu$ and having a radiation intensity of 4 to 30 watts/cm$^2$, the warm air section having a flow of warm air against the sheet at a rate of 5 to 30 m/sec. at a temperature of 100 to 400° C., the conveyor belt transporting the sheet at a speed ranging between 1 to 100 m. per min., and the conveyor being constructed and arranged so that the total time the sheet is subjected to infrared radiation and warm air is approximately on the order of one minute.

* * * * *